United States Patent [19]

Bonyhard

[11] 3,758,722

[45] Sept. 11, 1973

[54] NETWORK FOR TRANSPOSING SIGNAL BIT INTERLEAVING PATTERNS

[75] Inventor: Peter Istvan Bonyhard, Edison, N.J.

[73] Assignee: Bell Telephone Laboratories, Incorporated, Murray Hill, N.J.

[22] Filed: Feb. 22, 1972

[21] Appl. No.: 227,758

[52] U.S. Cl. ........ 179/15 A, 179/15 BV, 179/15 BA

[51] Int. Cl. ........ H03k 19/40

[58] Field of Search ........ 179/15 A, 15 BA, 179/15 AQ, 15 BV

[56] References Cited

UNITED STATES PATENTS

| | | | |
|---|---|---|---|
| 3,692,942 | 9/1972 | Inose | 179/15 A |
| 3,562,433 | 2/1971 | Ambrosio | 179/15 A |

*Primary Examiner*—Ralph D. Blakeslee
*Attorney*—W. L. Keefauver

[57] ABSTRACT

Time division multiplex signals arranged in transmission time frames of multibit time slot signals are entered into a first set of plural shift registers arranged to present at predetermined signal transfer points the predetermined signal bits of corresponding bit positions in each time slot of a frame. The predetermined signal bits comprise a miniframe in which each time slot includes only a part of the bits from a time slot in a complete transmission frame. At the end of a transmission time frame, the miniframe signals are transferred to a second set of plural shift registers. The sets of registers are configured for transposing time division signals in either direction between the transmission frame format and the miniframe format depending upon the manner of operation of the transfer between the sets of registers.

The shift registers are implemented in magnetic single wall domain technology.

Arrangements for either bit-series or bit-parallel interface with other signal paths are considered.

14 Claims, 3 Drawing Figures

Patented Sept. 11, 1973 3,758,722

2 Sheets-Sheet 1

Patented Sept. 11, 1973

3,758,722

2 Sheets-Sheet 2

NETWORK FOR TRANSPOSING SIGNAL BIT INTERLEAVING PATTERNS

BACKGROUND OF THE INVENTION

1. Field of the Invention

This invention relates to pulse signal control systems for interleaving digital signals in a predetermined order.

2. Description of the Prior Art

In one time division multiplex system, the time division signals are interleaved in short frames, here called miniframes, on a common highway wherein each time slot of a miniframe includes, for example, a corresponding bit position signal from a different time slot of a long signal frame, here called a transmission frame. A plurality of sequential miniframes on the common highway are required to contain a full corresponding transmission frame of signals and are sometimes called a superframe. This type of arrangement is employed because frame size affects the economy of different operations in different ways. Thus, it is advantageous to work with a relatively small time division signal frame in a switching network because it reduces the signal delay time through the network, and it also can reduce the size of control memories required for controlling the network. However, the larger transmission signal frame sizes are advantageously employed on individual time division signal transmission highways extending over long distances because of the greater convenience for synchronization and timing. An example of a system using short signal frames of the type here described is disclosed in the H. Inose and T. Saito U.S. Pat. No. 3,632,884.

In toll communication systems it may be necessary to employ alternate communication links using long and short frames. It is, therefore, desirable to have a convenient way to transpose signals between different frame sizes. Although it has been suggested that transposition be accomplished by shift register arrangements operating at different shift rates and phases, such arrangements are not convenient for use in the planar shifting technology using magnetic single wall domain devices wherein bit interleavers must operate at one rate and phase within a rotating magnetic field.

It is, therefore, one object of the present invention to simplify pulse signal control systems for interleaving digital signals.

It is another object to facilitate the translation of time division multiplex signals between a large signal frame of many time slot signals in succession and plural miniframes of fewer time slot signals in succession.

A further object is to accomplish frame size transposition in planar shifting technology.

SUMMARY OF THE INVENTION

The foregoing and other objects of the invention are realized in an illustrative embodiment in which plural shift registers of first and second sets are coupled between a first time division signal path operating in a long-frame mode and a second time division signal path operating in a short-frame mode. A transfer coupling between the sets of registers is controlled to determine the direction of transposition between signal modes. The first set of registers is arranged to present long-frame signals from the first path at the transfer coupling in a short-frame format, or vice versa. Similarly the second set of registers is arranged to present short-frame signals from the transfer coupling to the second path as a sequence of short frames, or vice versa.

It is one feature of the invention that a plurality of time division multiplex signal circuits are similarly coupled through respective frame shift registers to tandem-connected signal collecting shift registers so that each time the latter registers are loaded at the end of a transmission signal frame they contain miniframes of corresponding time slot signals from the respective circuits.

It is another feature of one embodiment that a pair of time division signal interleaving circuits, which are substantially mirror images of one another, are employed for coupling a first set of time division signal circuits to the input of a utilization network and for coupling an output of the same network to a second set of time division circuits.

A feature of an additional embodiment is that bit signals in bit series on a single circuit in the first path and a single circuit in the second path are coupled with the first and second sets of registers, respectively, through different amounts of delay; and the different delays for the first path are distributed among the first set of registers inversely with respect to the distribution of the different delays for the second path among the second set of registers.

A further feature is that a signal interleaving system of the present invention is implemented in the magnetic single wall domain technology, and all of the shift registers can be operated substantially continuously at the same shift rate.

BRIEF DESCRIPTION OF THE DRAWINGS

A more complete understanding of the invention and the various features, objects, and advantageous thereof may be obtained from a consideration of the following detailed description in connection with the appended claims and the attached drawings in which:

DETAILED DESCRIPTION

Figure 1:
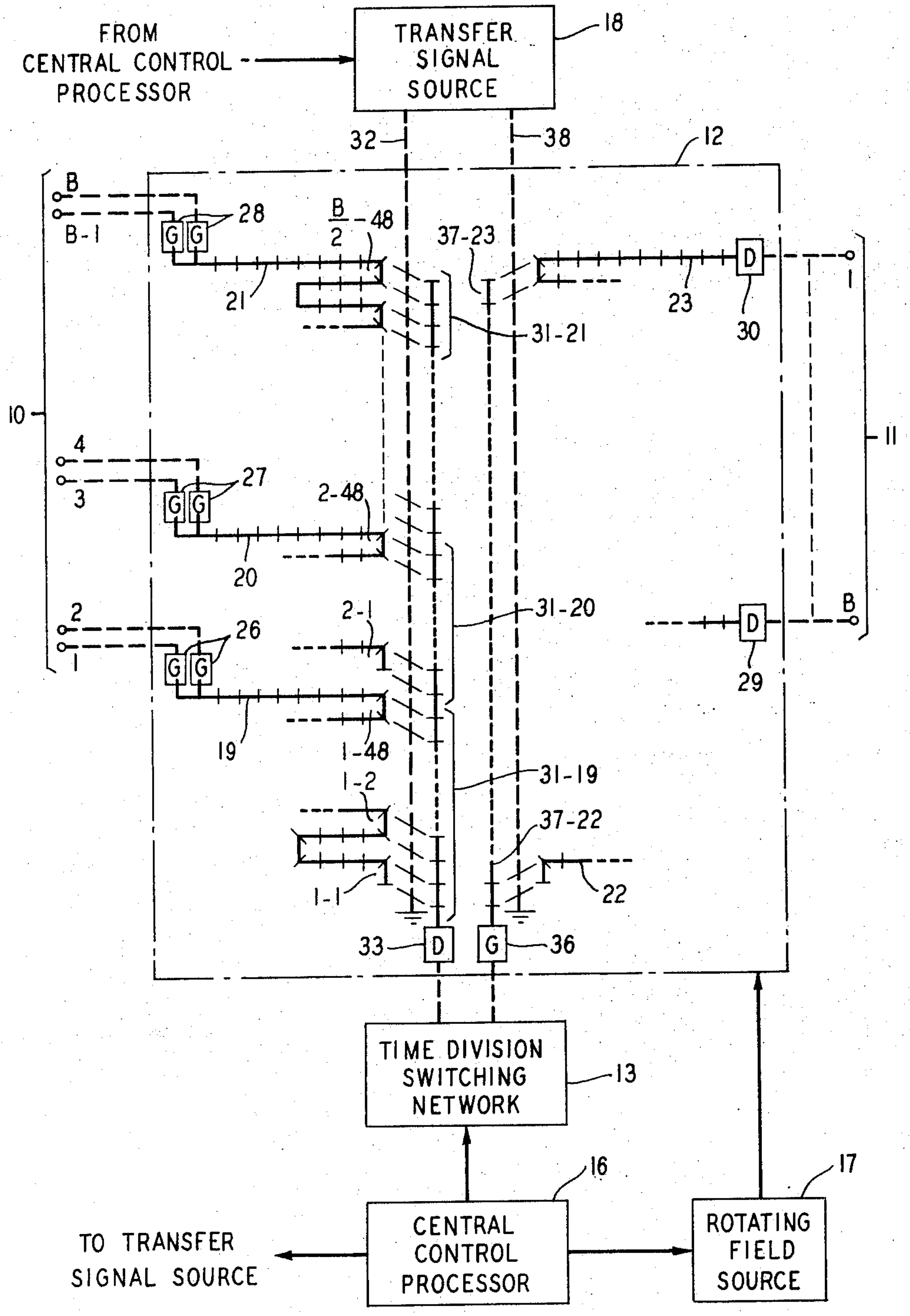
FIG. 1 includes a schematic representation of the invention as applied to a time division multiplex switching network.

In FIG. 1, n input time division multiplex signal circuits 10 and the same number of output time division multiplex signal circuits 11 are coupled to signal bit interleaving arrangements, in accordance with the present invention, in a sheet of substrate material 12. Circuits 10 together comprise the termination of a time division signal highway, or path, and circuits 11 similarly comprise the input to another highway. Such multicircuit highways advantageously serve as interfaces between a time division network and analog-to-digital or digital-to-analog conversion circuits, not shown. Single-circuit highway arrangements are subsequently considered.

Time division signals on the circuits 10 and 11 are organized in signal transmission frames of a predetermined number, N, of time slots which advantageously include interleaved samples of a plurality of call connections in a time division communication system. Each time slot signal includes a plurality, B, of signal bits representing a sample of a communication signal in a particular signal connection which is time sharing the highway with at least one other connection. Bits of a single time slot are distributed among the circuits of a highway for essentially simultaneous transmission. For example, in one embodiment, the time division signals on each of the highways included forty-eight time slots per frame, with ten signal bits in each time slot and the bits of each time slot being transmitted on different circuits of the highway.

Signals from the input circuits 10 are reinterleaved in a manner which will be described, and then coupled to a time division switching network 13 that is operated under the control of a central control processor 16. Output from the network 13 is similarly coupled through a bit reinterleaving arrangement in the substrate 12 to the set of output circuits 11. Other reinterleaving, or signal mode transposing, arrangements, not shown, also similarly couple other highways to network 13.

A central control processor 16 controls the operation of the network 13 in a manner which is known in the art and which need not be further considered here in order to demonstrate the principles of the present invention. The processor 16 also controls other time division system units. These other units include, for example, a rotating magnetic field source 17 and a transfer signal source 18 to be utilized for a purpose which will subsequently become evident.

The substrate 12 is composed of a material which is suitable for serving as a host for magnetic single wall domains and in which such domains can be controllably propagated. Propagation of domains takes place as a result of shifting magnetic field patterns within the substrate. Such patterns arise, for example, as a result of interactions between domains in the substrate and specially configured magnetic film overlays on the substrate. In one domain propagation technique, the substrate is arranged in a rotating magnetic field which produces a resultant field reorientation within the plane of the substrate. This is called a field access propagation arrangement, and one example of it is a field access shift register taught in the A. H. Bobeck U.S. Pat. No. 3,534,347.

The substrate 12 in the drawing includes a plurality of shift registers represented as solid lines with crosshatches therealong to represent schematically sequential domain positions beneath the overlay. Included among the shift registers are plural input registers, such as the registers 19, 20, and 21 specifically shown in the drawing; and plural output shift registers, such as the registers 22 and 23 specifically shown in the drawing. These input and output registers are hereinafter called frame registers. Each of the frame registers is electromagnetically coupled to a different pair of the input circuits 10 by way of a different one of plural domain generator pairs 26, 27, and 28, respectively. Similarly, the output frame registers are electromagnetically coupled to the output circuits by way of domain detectors, such as the detectors 29 and 30 in the drawing. Domain detectors and generators are not here considered in detail since various forms thereof, which are suitable for the present application, are now well known in the art.

Each of the input frame registers is arranged in a serpentine configuration and includes a number of bit position stages equal to the number of bits in a transmission frame on the input highway. Corresponding pairs of bit positions in successive time slot positions in each of the input frame registers are aligned at locations along the right-hand edge of the serpentine pattern of the registers as shown in FIG. 1, and the edges of the various input frame register serpentine patterns are also advantageously aligned with one another. Alternate bights in the serpentine pattern of each register are numbered to indicate the number of the input circuit pair supplying the frame register and the number of the corresponding time slot position in the serpentine pattern of the register. Thus, in the drawing the bights numbered 1–1, 1–2, and 1–48 are in a frame register supplied by the first input circuit pair, including circuits No. 1 and No. 2; and they represent the first, second, and 48th time slot positions in a 48-time slot signal from the input highway. Similarly, bights 2–1 and 2–48 represent the parts of the first and 48th time slot positions supplied from the second input circuit pair, including circuits No. 3 and No. 4. The B/2 − 48 bight represents the part of the 48th time slot position supplied from the B/2th input circuit pair including circuits No. (B–1) and No. B.

Signal collector shift registers 31 are operated in tandem on the substrate 12 for propagating domains along a path which is substantially parallel to the aligned edges of the input frame register serpentine patterns. The collector registers illustrated are registers 31–19, 31–20, and 31–21 for the three input frame registers actually indicated in the drawing. A domain transfer arrangement of the type taught in the copending application of D. E. Kish and J. L. Smith, Ser. No. 128,889, filed Mar. 29, 1971, now U.S. Pat. No. 3,697,963, and assigned to the same assignee as the present application, is arranged between the input frame shift registers and the collector registers 31. The direction of domain transfer depends upon transfer pulse polarity and rotating field phase in which the pulse is applied. This transfer arrangement is activated by transfer signals on a circuit 32 included in the arrangement for transferring domains from transfer output points on the aligned bights of the input shift registers to inputs of corresponding bit position stages of the collector registers 31. Circuit 32 is pulsed for this purpose by the transfer signal source 18 at the end of each transmission frame on the input circuits 10.

The rotating field source 17 produces the in-plane rotating field at a rate which is a multiple of the input signal bit rate on one of the circuits 10. That multiple is equal to the number of circuits in the input highway times the number of bits which are coupled from such a circuit to an input frame register at any given time, as will be discussed. Thus, for an embodiment containing ten input circuits in the illustrated input highway, the in-plane field produced by source 17 rotates through a number of cycles which is equal to ten times the input signal bit rate on one of the circuits 10. Direction of field reorientation depends upon the particular register overlay configuration employed and the desired direction of propagation therein.

Each input signal bit from an input circuit is entered into an associated register, such as one of the frame registers 19, 20, and 21. Circuits 10 of the input circuit set are paired, and each pair provides signals to operate a corresponding one of the pairs of domain generators 26-28 in the respective frame registers in accordance with the bit information from circuits 10. Thus, two signal bits are simultaneously represented in magnetic single wall domain format and entered in the first two stages of the corresponding input frame registers. As the magnetic field reorients in substrate 12, domain representations of signal bits in the frame registers are propagated initially toward the right and then downward through the serpentine portions of the respective frame registers. By the time that a first bit pair has reached the bight position B/2 − 48 in its frame register, a new bit pair is being entered at the domain generators. At the end of a transmission frame, the forty-eight signal bit pairs of the forty-eight time slots are located along the right-hand edges of the serpentine patterns of the frame registers into which the bit pairs were propagated. At that time, processor 16 causes transfer signal source 18 to pulse the circuit 32 for transferring any domains in those aligned bit position pairs into the registers 31.

At this time, just after a transfer pulse, the collector registers 31 each include a miniframe of forty-eight partial time slot signals, each partial signal including two bits in the FIG. 1 embodiment. As the in-plane magnetic field continues to rotate, the contents of registers 31 are shifted out through a domain detector 33 to the time division switching network 13. At the same time that domains are being shifted out of the registers 31, new sets of time slot signals are being entered into the input frame registers from the input circuits 10. Four hundred and eighty cycles of the in-plane magnetic field are required to clear the collector registers 31 for the assumed example of a 48-time-slot transmission frame of ten bits per time slot. This is the same number of cycles required to load the input frame registers with domains corresponding to a new frame of signals from input circuits 10. The foregoing operations are repeated continuously.

Upon completion of operations on the reinterleaved signals, i.e., miniframes, in the switching network 13, they are supplied in bit series, time slot interchanged within their miniframes as required for switching, through a domain generator 36 to tandem output collector shift registers 37. The collector registers 37 and cooperating output frame registers, such as the registers 22 and 23, are schematic mirror images of input frame registers and collector registers. Actual magnetic overlay configurations differ somewhat to accommodate different propagation directions as is known in the art. For example, collector registers 37 must have somewhat different overlay configurations as compared to registers 31 because the registers 37 collect miniframes in series, propagate them upward instead of downward, and release them in parallel to output frame registers. Output collector and frame registers are subject to the same in-plane magnetic field as are the input frame and collector registers.

Domains from generator 36 are propagated upward in registers 37 during a transmission frame. At the end of each transmission frame, transfer signal source 18 pulses a circuit 38 for actuating another domain transfer arrangement, similar to that including circuit 32, which thereby transfers domains from registers 37 in bit parallel to the output frame registers of the reinterleaving arrangement on substrate 12. Thereafter, the domains are propagated along serpentine paths of output frame registers to the output circuits 11. Assuming that miniframes pass through network 13 on a first-in-first-out basis, the output circuit number 1 is associated with the upper end of register 37–23, while the input circuit number 1 is associated with the lower end of register 31–19, as shown in the drawing.

It will be recognized, of course, that different ratios of transmission frame bit rate to rate of field rotations allow different ratios of frame sizes to be transposed in the arrangement here described. However, in all cases, the rotating field established by source 17 operates all magnetic, single wall domain, shift registers in substrate 12 continuously at the same rate.

Figure 2:
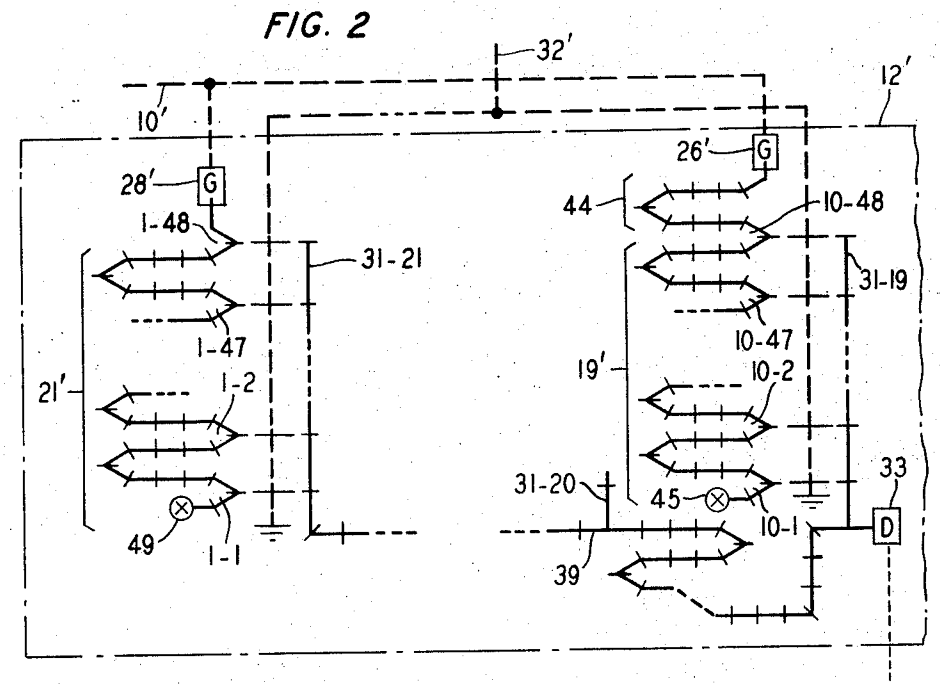
FIGS. 2 and 3 are different parts of a modified form of the invention.
Figure 3:
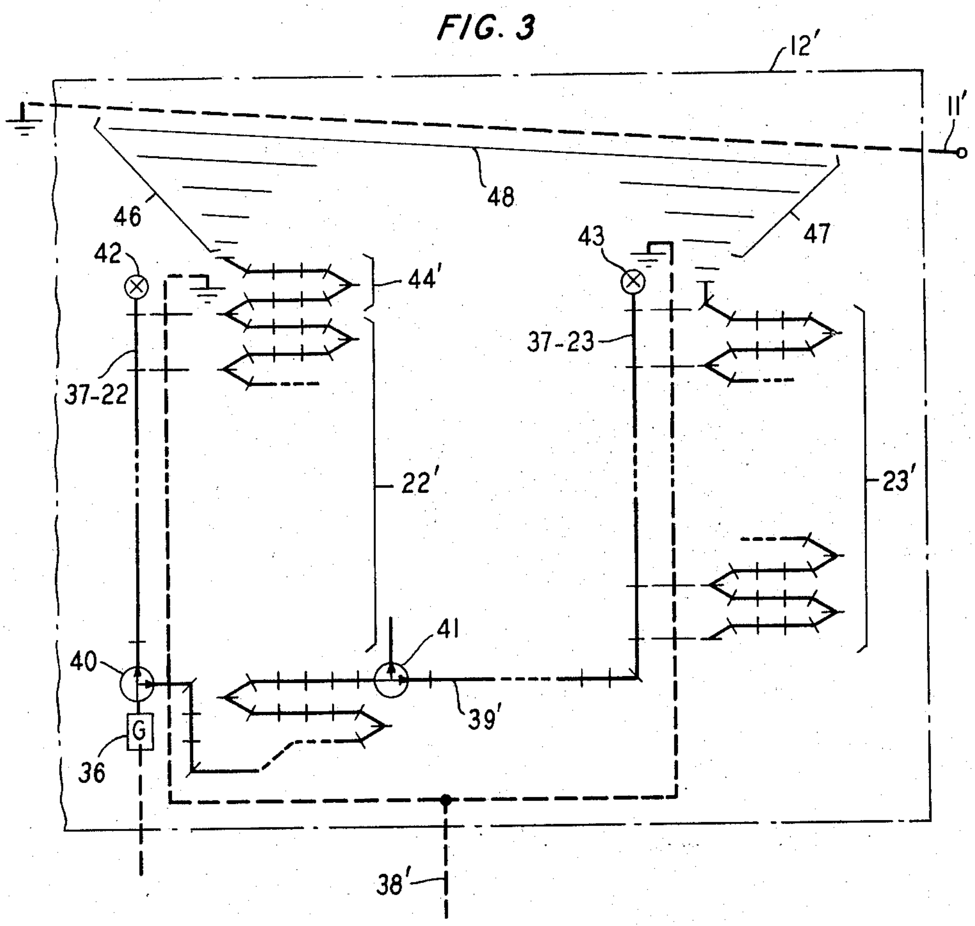

FIG. 2 is a modified form of input signal interleaver corresponding to the input portion of FIG. 1 which includes the frame registers 19, 20, and 21. In FIG. 2, the same or similar reference characters are utilized for corresponding interleaver parts. A cooperating output portion is shown in FIG. 3. Examination of the numbers of bits in frames and time slots used in the embodiment of FIG. 1 demonstrates that substrate 12, if it contained only the two illustrated interleaving arrangements, would be about twenty-five bit positions wide and 480 bit positions long. Such a narrow strip is sometimes inconvenient in terms of obtaining a substrate member. An interleaving technique is employed in FIGS. 2 and 3 which allows a magnetic overlay configuration on the substrate 12' which more closely approaches a square configuration. It will be found from consideration of the embodiment of FIGS. 2 and 3 that the substrate is about 160 bit positions wide and about 110 bit positions in length. In addition, the embodiment of FIG. 2 accommodates a bit-series type of signal input rather than the bit-parallel type of input utilized in FIG. 1.

In FIG. 2, the substrate 12', only partially illustrated in the figure, includes frame shift registers such as the registers 19' and 21' arranged in serpentine patterns and having individual input mangetic single wall domain generators 26' and 28'. A different frame register is provided in the embodiment of FIG. 2 for each bit of a time slot of an input time division signal on input circuit 10'. Consequently, each frame register has one, single-bit, transfer point per transmission frame time slot position. Also in this embodiment, the rate of reorientation of the in-plane magnetic field is the same as the time division multiplex signal bit rate on input circuit 10'. The domain generators, such as 26' and 28', are driven in parallel by the time division signal bits instead of being individually driven by different bit combinations of each time slot signal. Generator 26', and all other input generators except generator 28', are coupled to the frame registers such as register 19' by way of stepped delay registers. That is, each generator is coupled to its frame register through a delay register of different length. Thus, generator 26 is coupled to the input of frame register 19' through a delay register 44 including nine tandem-connected stages after the generator 26 and before the first transfer point of frame register 19'. Each other generator (not shown) except generator 28', has a similar delay register having successively one less stage until, at the left-most generator 28', the coupling is provided by no delay stages for an embodiment wherein B is equal to ten bits per time slot.

The result of the foregoing coupling of the domain generators to the various frame registers is that each input signal, i.e., transmission, frame is completely applied to all of the frame registers in different phase. Thus, when the first bit of the first time slot of a transmission frame is propagated from domain generator 26' through stepped delay register 44 and frame register 19' to the lowermost output transfer point, 10–1, of the latter register, as shown in FIG. 2, the first bit of the last time slot in the same frame appears simultaneously at the uppermost transfer point, 10–48, of the register 19'. However, at the same time the final bit of each time slot in the same signal frame appears at the respective successive transfer points of the frame register 21'. Similar phase differences occur in progressive magnitudes for the remaining frame registers not specifically shown in FIG. 2. Thus a miniframe of one bit per transmission frame time slot is present at the right-hand edge of the serpentine pattern of each frame register. Domain annihilators, such as annihilators 45 and 49, are provided at the lower ends of the respective frame registers.

Domain transfers from frame registers in FIG. 2 to respective collector registers 31–19 through 31–21 are accomplished simultaneously by a pulse on circuit 32' from the signal source 18, shown in FIG. 1. However, that pulse is applied in FIG. 2 at nine bit times after the end of each input signal frame; and it is extended in multiple to the branches of the circuit 32' associated with the respective collector registers 31.

Collector registers in FIG. 2 have a register period which is twice the register period of the corresponding frame registers becuase only one bit per time slot is transferred from each frame register bight. A register period in magnetic single wall domain shift registers is usually considered to be the spacing along the substrate between corresponding points in adjacent, possible, domain locations, as defined by attractive magnetic poles in the magnetic film overlay, in a domain propagation path at any given rotating field orientation. Domains received in the collector registers 31–19 through 31–21 of FIG. 2 from the associated frame registers are propagated downward, as illustrated in FIG. 2, toward a tapped delay register 39. The latter register includes nine, (B-1), tandem-connected sections of N tandem connected stages each. Each stage of register 39 advantageously has a period approximately the same as the frame register period.

Register 39 has tap inputs at the beginning and the end of the register as well as at junctions between adjacent sections thereof. Collector register 31–19 has its output coupled to the first, i.e., rightmost, tap of register 39 so that domains propagating in that collector register are propagated immediately to the domain detector 33. Similarly, collector register 31-20 has its output coupled to the second tap of register 39 so that such output is coupled through one section of register 39 before reaching domain detector 33. Since each collector register has N stages and each section of register 39 has N stages, the output of collector register 31–20 reaches detector 33 immediately after the output of register 31–19. Miniframe signals provided by other collector registers in the arrangement of FIG. 2 similarly are caused to fall into line behind miniframes entered into register 39 at taps further to the right along that register. Finally, the miniframe provided from collector register 31–21 is loaded into register 39 and propagated to detector 33 as the final miniframe portion of the corresponding transmission frame that had been received from input circuit 10'.

FIG. 3 illustrates another part of the substrate 12' which was partially shown in FIG. 2. The portion shown in FIG. 3 contains a modified output signal interleaving arrangement which is, in many respects, a mirror image counterpart of the input interleaving arrangement described in connection with FIG. 2. Thus, stepped delay registers, such as the register 44', frame registers, collector registers, and domain transfer arrangements between collector registers and associated frame registers are of essentially the same type as those shown in FIG. 2. Input and output coupling to the interleaving arrangements are modified in FIG. 3 to accommodate the opposite, with respect to FIG. 2, direction of signal mode transposition for the magnetic single wall domain embodiment.

Signal miniframes are applied by way of the domain generator 36 and transposed into the larger transmission signal frames on a time division multiplex signal highway represented by the circuit 11'. Tapped delay register 39' has at each tapping point, except the rightmost one as shown in FIG. 3, a magnetic single wall domain fanout unit, such as fanout units 40 and 41. These fanout units are of the type employed in the copending application of I. Danylchuk, Ser. No. 41,028, filed May 27, 1970, now U.S. Pat. 3,713,118 and assigned to the same assignee as the present application. Domains are propagated from left to right through the sections of tapped delay register 39', and each domain is split into two domains at each fanout unit. One of the two fanout domains continues along the propagation path of register 39', and the other is propagated upward into and through the associated one of the collector registers. Each of the latter registers has a known type of domain annihilator, such as the annihilators 42 and 43, at the upper or output end thereof.

At the end of a series of B miniframes, which series comprises all of the signals of a full transmission frame, the miniframes of the first bits of every transmission frame time slot are in the collector register 37–23; and the miniframes containing the corresponding bit signals of the other nine bits are in the respective sections of register 39'. The miniframe containing corresponding final bits of all transmission time slot signals resides at this time at the leftmost section of register 39', and a duplicate thereof resides in the collector register 37–22. Similarly, duplicates of other miniframes in other sections of register 39' are contained in the associated collector registers which receive outputs from the fanout units at the respective tapping points. Now a transfer pulse on the electric circuit 38' transfers the domains of the miniframes to the associated frame registers where the miniframes are propagated upward along the serpentine paths of the frame registers and through the respective stepped delay registers, if any, at the upper ends thereof.

Magnetic single wall domain OR logic, to be described, is advantageously employed to couple the outputs of stepped delay registers and of frame register 23' to circuit 11' of the output time division multiplex highway. Because of the use of the stepped delay registers for supplying frame register outputs to inputs of the OR logic, corresponding bits of each transmission frame time slot reach circuit 11' in sequence with the first bit supplied from frame register 23' arriving first, and the last bit from frame register 22' arriving last for each time slot.

The OR logic is advantageously made up of a group of domain expanders such as the expanders 46 and 47. That type of expander is disclosed in the copending application of A. H. Bobeck, F. J. Ciak, and W. Strauss, Ser. No. 201,775, filed Nov. 24, 1971, now U.S. Pat. No. 3,702,995, and assigned to the same assignee as the present application. In expanders of the mentioned type a series of multielement so-called chevron, magnetic, overlay patterns, or stages, of increasing pattern length are provided along the direction of domain propagation. The respective multielement patterns extend transversely to the direction of domain propagation. In each cycle of the in-plane rotating field, a domain which had been entered into the first and shortest transverse multielement chevron pattern is transferred to the next adjacent and larger pattern and is correspondingly elongated along such pattern. Enough of such chevron patterns are included in each expander to expand a domain until it is large enough to generate a signal of adequate signal-to-noise ratio by the time that it is propagated under the electric circuit 11'. The portion of that circuit on substrate 12' is a magnetoresistive conductor extending from ground across the detection stage of the expanders to become the output time division circuit served by the interleaver. Each expanded domain passing under circuit 11' is further propagated, by stages not shown, to a collapser conductor loop, not shown, where the domain is annihilated. Equal numbers of steps are utilized in FIG. 3 in each of the expanders 46 and 47, and in others not shown. In some applications chevron expander patterns for adjacent OR logic input connections merge before attaining sufficient domain length to produce the desired electrical output signal level. In that case, one or more additional, merged, multielement, chevron patterns, such as the pattern 48 in FIG. 3, which extend across all of the expanders, are added until enough total steps are provided to produce sufficiently large domains for generating the desired detection signal level.

Although the invention has been described in connection with particular embodiments thereof, it is to be understood that additional embodiments and modifications, which will be obvious to those skilled in the art, are included within the spirit and scope of the invention.

What is claimed is:

1. In combination,
- a first shift register means having a number of stages at least equal to the number of pulse times in a time division multiplex signal frame time wherein each said frame time includes a plurality of multipulse time slot signals and successive groups of said register means stages comprise time slot positions,
- a second shift register means,
- means for coupling signals between each time slot position of said first shift register means and said second shift register means in signal pulse parallel over a predetermined number, at least one, of said stages of each such time slot position, said number of said stages being less than the total number of stages of such time slot position.

2. The combination in accordance with claim 1 in which said first and second shift register means include means for operating such shift register means substantially continuously in a signal shifting mode at the same rate.

3. In combination,
- means for transmitting a time division multiplex signal including successive signal frames of plural time slot signals, each time slot signal including plural signal bits,
- means, operable at a predetermined signal bit rate, for presenting signal bits of corresponding bit positions in each time slot of a frame in a bit-parallel group comprising a miniframe of time division multiplex signals in which each time slot of said miniframe corresponds to a different time slot of one of said signal frames but includes only a part of the signal bits of such signal frame time slot,
- collector shift register means operable at said bit rate,
- means for transferring each bit-parallel group to said collector shift register means, and
- means for propagating signals from the collector shift register means to a common propagation circuit.

4. In combination,
- at least one time division multiplex signal highway,
- a plurality of first shift register means coupled to said highway, each shift register means having one stage per bit time of a time division multiplex signal transmission frame on said highway,
- signal transfer means coupled to plural predetermined stages of each of said shift register means,
- second shift register means each having a number of stages equal to the number of said signal transfer means for one of said first shift register means, each stage of the last-mentioned shift register means being coupled to a different one of said signal transfer means, and
- means, operative near the end of each signal transmission frame, for actuating said signal transfer means to transfer signals in a predetermined direction between said predetermined stages and said last-mentioned shift register means.

5. The combination in accordance with claim 4 in which each of said first shift register means comprises
- output coupling means in each of said predetermined stages thereof,
- said second shift register means stages each include input coupling means, and
- said signal transfer means comprise means for coupling each output coupling means to a different input coupling means of said second shift register means.

6. The combination in accordance with claim 4 in which each of said first shift register means comprises
- input coupling means in each of said predetermined stages thereof,
- said second shift register means stages each include output coupling means, and
- said signal transfer means comprise means for coupling each input coupling means to a different output coupling means of said second shift register means.

7. The combination in accordance with claim 4 in which
- said signal highway comprises means for coupling signals between said first shift register means and such highway at a first predetermined signal bit rate, and
- means are provided for actuating said first shift register means and said second shift register means in unison at a second predetermined signal bit rate that is different from said first rate by a factor which is equal to the product of the number of said first shift register means per highway times the number of time division signal bits that are simultaneously coupled from a highway to one of said first shift register means.

8. The combination in accordance with claim 4 in which
- signals on said time division multiplex signal highway comprise signal frames of a predetermined number of successive time slot signal bit groups in each frame, means are provided to couple a predetermined number, at least one, of bits at a time from said highway to each of said first shift register means, said shift register means and said signal transfer means comprise a substrate of material suitable for sustaining and propagating magnetic single wall domains, means overlayed on said substrate to enable for each of said first shift register means the propagation of magnetic single wall domain representations of signal bits through a serpentine path in which successive time slot word length signal byte positions each have a corresponding part, including a predetermined number of bit positions, aligned along a predetermined path, means, overlayed on said substrate, for enabling for said second shift register means the propagation of domains along a path parallel to said predetermined path, and means for coupling domains between said corresponding parts and respective stages of said second shift register means.

9. The combination in accordance with claim 8 in which said highway includes a plurality of circuits, one for each bit of a time slot, arranged for signal transmission in bit parallel, said circuits being grouped *n* circuits per group where *n* is equal to said predetermined number of bit positions,

*n* means for controllably generating magnetic single wall domains at the first *n* input stages to each of said first shift register means, and means for coupling each said group of circuits to said generating means, respectively, for actuating such generating means in concert in response to signals on said circuits.

10. In combination, a first circuit means for propagating time division multiplex signals including signal transmission frames of plural time slot signals in which each time slot signal includes a plurality of signal bits, a second circuit means for transmitting time division multiplex signals including successive miniframes of time slot signals, each of which includes at least one signal bit, the total number of bits in each second circuit time slot being less than the total number of bits in each time slot on said first circuit, a plurality of frame shift registers, each register including a sufficient number of tandem-connected stages to contain a full frame of said time division signals of said first circuit means, a plurality of collector shift registers equal in number to the plurality of frame shift registers, each of said collector shift registers having a sufficient number of stages to accommodate in bit series at least one signal bit for each time slot of a frame of said first circuit means, means, operable at substantially the end of each of said first circuit means frames, for transferring signal representations in a predetermined direction between a frame register and the stages of a corresponding one of said collector shift registers, means for coupling said collector shift registers to provide signals to, or receive signals from, said second circuit means depending upon said predetermined direction of coupling in respect to the corresponding one of said frame shift registers, and means for coupling said first circuit means to provide signals to, or to receive signals from, each said frame register depending upon said predetermined direction of coupling in respect to the corresponding one of said frame shift registers.

11. The combination in accordance with claim 10 in which each of said frame shift registers includes at least one input connection, said first circuit means comprises a plurality of circuit paths, each path transmitting at least one bit of each time slot signal on said first circuit means, means for coupling each of said paths to a different one of said frame shift register input connections, and means for coupling said collector shift registers in tandem for coupling said miniframe signals between said frame registers and said second circuit means.

12. The combination in accordance with claim 10 in which said first circuit means comprises a circuit for transmitting the bits of said frames in bit series, said first circuit coupling means comprises means for coupling each bit of a transmission frame to all of said frame registers, and further comprises delay propagation paths, having different amounts of delay, between said first circuit means and each of said frame registers, such that each bit enters each frame register in a different phase, and said means for coupling said collector registers to said second circuit means comprises, a shift register of (B-1) sections, each section including N stages of delay, where B equals the number of bits in a time slot of said transmission frame, and N equals the number of time slots in a transmission frame, and means for applying the output of each of said collector shift registers to said second circuit means through a different number of said B-1 sections, the numbers of sections being distributed among said collector registers inversely with respect to the amount of delay between said first circuit means and corresponding frame registers.

13. The combination in accordance with claim 10 in which said means for coupling said second circuit means to said collector registers comprises, a shift register of (B-1) sections, each section including N stages of delay, where B equals the number of bits in a time slot of said transmission frame, and N equals the number of time slots in a transmission frame, and means for applying miniframes from said second circuit means to each of said collector shift registers through a different number of said B-1 sections, said means for coupling said frame registers to said first circuit comprising OR logic means, and means for coupling each of said frame registers to a different input of said OR logic means through a different amount of signal propagation delay, said different amounts of signal propagation delay being distributed among said frame registers inversely with respect to the distribution of the numbers of said B-1 register sections.

14. The combination in accordance with claim 10 in which said first circuit means comprises input circuit means and output circuit means, said second circuit means comprises input circuit means, output circuit means, and signal utilization means coupled to receive signals from said output circuit means of said second circuit means and to supply signals to said input circuit means of said second circuit means, said plurality of frame shift registers include input frame registers coupled by said first circuit coupling means to receive signals from said first circuit input circuit means and include output frame registers coupled by said first circuit coupling means to provide signals to said first circuit output circuit means, and said plurality of collector shift registers include input collector registers coupled by said second circuit coupling means and said transferring means to couple signals from said input frame registers to said second circuit means output circuit means, and include output collector registers coupled by said second circuit coupling means and said transferring means to couple signals from said second circuit means input circuit means to said output frame registers.

* * * * *